(12) United States Patent
Lizarraga Senar

(10) Patent No.: US 10,323,712 B2
(45) Date of Patent: Jun. 18, 2019

(54) SYSTEM FOR CONTROLLING VARIABLE LOAD IN A HYDRAULIC DEVICE

(71) Applicant: KYB EUROPE HEADQUARTERS, GmbH, Ororbia (Navarra) (ES)

(72) Inventor: Javier Lizarraga Senar, Orobia (ES)

(73) Assignee: KYB EUROPE HEADQUARTERS, GMBH, Ororbia (Navarra) (ES)

( * ) Notice: Subject to any disclaimer, the term of this patent is extended or adjusted under 35 U.S.C. 154(b) by 0 days.

(21) Appl. No.: 14/906,716

(22) PCT Filed: Jun. 20, 2014

(86) PCT No.: PCT/ES2014/070505
§ 371 (c)(1),
(2) Date: Jan. 21, 2016

(87) PCT Pub. No.: WO2015/011314
PCT Pub. Date: Jan. 29, 2015

(65) Prior Publication Data
US 2016/0153517 A1  Jun. 2, 2016

(30) Foreign Application Priority Data

Jul. 25, 2013  (ES) .................................. 201331137

(51) Int. Cl.
*F16F 13/00* (2006.01)
*F16F 9/34* (2006.01)
(Continued)

(52) U.S. Cl.
CPC .......... *F16F 13/007* (2013.01); *B60G 15/061* (2013.01); *B60G 17/08* (2013.01);
(Continued)

(58) Field of Classification Search
CPC .. F16F 9/49; F16F 9/348; F16F 9/3485; F16F 9/483; F16F 9/523; F16F 9/585
See application file for complete search history.

(56) References Cited

U.S. PATENT DOCUMENTS 3,150,747 A   9/1964  Bliven et al.
3,450,235 A * 6/1969  Lohr ................... B60G 17/044
                                              188/282.8
(Continued)

FOREIGN PATENT DOCUMENTS

GB     763557       12/1956
GB     792895       4/1958
WO     2005/106282  11/2005

OTHER PUBLICATIONS

International Search Report dated Oct. 1, 2014 in International Application No. PCT/ES2014/070505.

*Primary Examiner* — Thomas J Williams
*Assistant Examiner* — James K Hsiao
(74) *Attorney, Agent, or Firm* — Wenderoth, Lind & Ponack, L.L.P.

(57) ABSTRACT

A hydraulic device includes a tubular housing containing a rod to which a plunger is rigidly secured that separates an upper chamber and a lower chamber both filled with a hydraulic fluid such that the plunger and the rod move together in a relative manner axially inside the tubular housing, thereby moving the hydraulic fluid from one chamber to the other and varying the volumes thereof. The hydraulic device further includes a spring that operates under compression resisting the movement of the plunger in one direction when the plunger moves toward a maximum extension position of the hydraulic device. The hydraulic device also includes an open elastic ring, the ends of which define an adjustable intermediate passage for the hydraulic fluid in order to adjust damping at the end of maximum (Continued)

extension of the hydraulic device and in other relative positions.

10 Claims, 4 Drawing Sheets

(51) Int. Cl.
    *F16F 9/348*     (2006.01)
    *B60G 15/06*     (2006.01)
    *B60G 17/08*     (2006.01)
    *F16F 9/48*     (2006.01)
    *F16F 9/516*     (2006.01)
    *F16F 9/49*     (2006.01)

(52) U.S. Cl.
    CPC .............. *F16F 9/348* (2013.01); *F16F 9/483* (2013.01); *F16F 9/49* (2013.01); *F16F 9/516* (2013.01); *B60G 2202/312* (2013.01); *B60G 2500/11* (2013.01); *B60G 2800/16* (2013.01); *F16F 2222/12* (2013.01); *F16F 2228/066* (2013.01)

(56) References Cited

U.S. PATENT DOCUMENTS

| | | | | |
|---|---|---|---|---|
| 4,183,509 | A | * | 1/1980 | Nishikawa ........... B60G 15/063 188/319.2 |
| 4,284,177 | A | | 8/1981 | Domek |
| 4,312,499 | A | * | 1/1982 | Wossner .................... F16F 9/49 188/288 |
| 4,345,748 | A | * | 8/1982 | Wossner .............. B60G 15/061 188/322.17 |
| 4,558,767 | A | * | 12/1985 | Taylor ..................... F16F 9/516 138/31 |
| 4,842,238 | A | * | 6/1989 | Toiyama ................. B63B 29/04 188/322.17 |
| 4,901,828 | A | * | 2/1990 | Schmidt .................... F16F 9/48 16/51 |
| 9,593,697 | B2 | * | 3/2017 | Baalmann ................. F16F 9/49 |
| 2003/0006539 | A1 | * | 1/2003 | Bertram ................. F16F 9/0209 267/120 |
| 2009/0223759 | A1 | * | 9/2009 | Kim ........................ F16F 9/003 188/297 |
| 2015/0247549 | A1 | * | 9/2015 | Takeno ................... F16F 9/585 188/297 |
| 2015/0330475 | A1 | * | 11/2015 | Slusarczyk ............ B21D 22/20 188/288 |

* cited by examiner

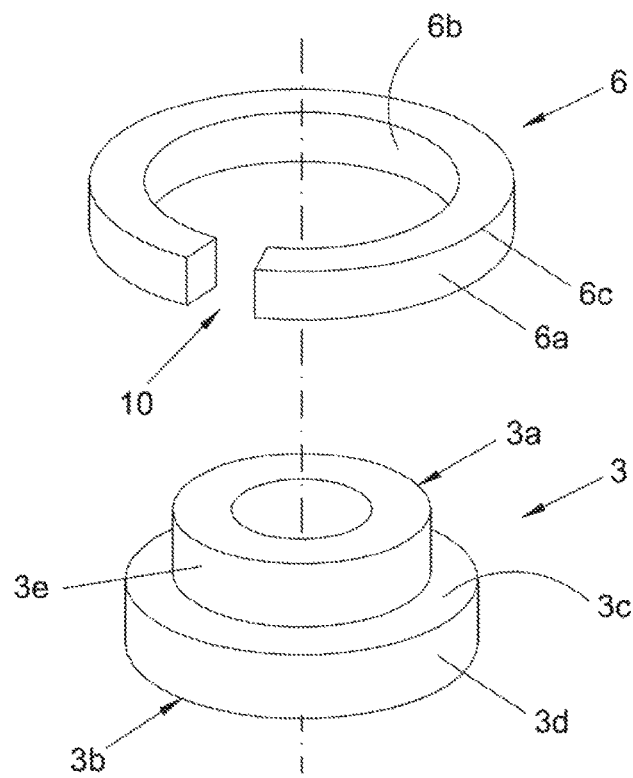
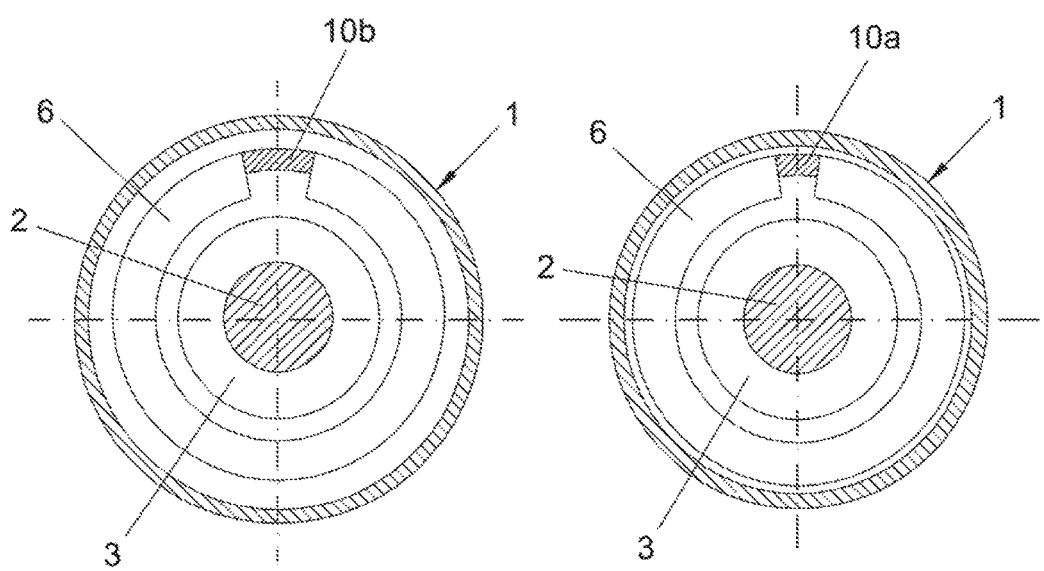
FIG. 4
FIG. 5
SEC. A-B
FIG. 6
SEC. C-D

SYSTEM FOR CONTROLLING VARIABLE LOAD IN A HYDRAULIC DEVICE

BACKGROUND OF THE INVENTION

1. Field of the Invention

The present invention, as described in the title of this description, refers to a system for controlling variable load in a hydraulic device that aims to control the development of the hydraulic load.

2. Description of Related Art

Currently, certain shock absorbers are known for comprising two assembled parts: a first part composed of a rod-piston assembly and a second part comprising a housing of tubular structure through the inner space of which the rod-piston assembly slips when in contact with a hydraulic fluid. This assembly allows decoupling of the movement of the rigid mounting to the housing from the movement of the rigid mounting of the rod-piston assembly, such that the hydraulics are able to filter, either partially or totally, the frequencies which are not intended to be transmitted from one mounting to the other.

Based on the geometric limitations of the physical environment where the shock absorber operates, the maximum distance the piston can travel inside the housing (the stroke of the shock absorber) is limited.

In certain devices, said limitations are implemented by means of mechanical stops:
  When the minimum length of the shock absorber is limited, these stops are known as compression stops, maximum compression stops, etc.
  When the maximum length of the shock absorber is limited, these stops are known as rebound stops, and maximum extension stops.

In some applications of the shock absorber, the relative abruptness of these mechanical stop mechanisms may have undesirable results due to lack of comfort, excessive noise, wearing out due to continued use, etc.

SUMMARY OF THE INVENTION

It is applicable, for example, to shock absorbers, such that with the system of the invention the problems of abruptness are reduced, during a first stroke in one direction that ends at maximum compression and also during another stroke, in a direction contrary to the first, which ends at a maximum extension of the shock absorber, so that said reduction in abruptness is especially controlled at the end of the first and second stroke of the hydraulic device, especially by the end of the maximum extension stroke.

For said purpose by the end of the strokes, the first and the second, a mechanic damping is combined with a hydraulic damping wherein the passing section of a hydraulic fluid from a first chamber to a second chamber progressively varies until the strokes are completed.

With the aim of achieving the objects and preventing the inconveniences mentioned in previous paragraphs, the invention proposes a system for controlling variable load in a hydraulic device that efficiently reduces the abruptness problems mentioned before.

The hydraulic device comprises a tubular housing containing a rod to which a plunger is rigidly secured that separates an upper chamber and a lower chamber both filled with a hydraulic fluid, such that, as the plunger and the rod move, they move together in a relative and axial manner inside the tubular housing, moving the hydraulic fluid from one chamber to the other, varying the volumes thereof, although inside the tubular housing a common total volume of hydraulic fluid is always maintained, also comprising a spring that operates under compression resisting the movement of the plunger in one direction when it moves towards a maximum extension position of the hydraulic device, wherein said movement towards the maximum extension position progressively reduces the volume of the upper chamber. The hydraulic device also adopts a minimum extension rest position wherein the spring has a maximum length.

The control system of the invention comprises an open elastic ring located inside the tubular housing surrounding at least part of the plunger, defining between the ends of said open elastic ring an intermediate passage through which the hydraulic fluid flow travels from one chamber to the other in both directions, dragging the movement of the rod and plunger assembly to the open elastic ring.

The tubular housing comprises an upper part whose interior comprises at least one tubular hole that becomes narrower from bottom to top and whose lower edge of greater diameter joins a lower part of the tubular housing by means of an annular seat supporting at least the outer portion of the open elastic ring in a rest position of the hydraulic device.

The open elastic ring comprises an outer diameter defined between the larger and smaller diameter of the tubular hole wherein this open elastic ring is housed, the outer diameter of the open elastic ring being greater than the outer diameter of the plunger.

During the displacement of the plunger towards the maximum extension position of the hydraulic device, the open elastic ring has its outer side in contact with the inner side of the tubular hole progressively changing the passing section of the intermediate passages as long as the open elastic ring approaches the maximum extension position of the hydraulic device.

In an embodiment, the minimum passing area of the intermediate passage of the open elastic ring coincides with a maximum compression of the spring.

In another embodiment, during the maximum compression of the spring, the ends of the open elastic ring are in contact one to each other, thus totally blocking the intermediate passage of the hydraulic fluid.

In another embodiment, the maximum compression of the spring in the maximum extension position of the hydraulic device comprises a block wherein the coils are in contact with each other.

The plunger comprises a lower section of greater diameter and an upper section of smaller diameter around which the open elastic ring is loosely coupled.

A lower end of the spring is coupled to a washer adjusted with free axial movement around the rod and above the plunger onto which said washer rests.

The open elastic ring has its axial movement restricted by the washer and by the lower section of the plunger.

The washer comprises an upper section of smaller diameter and a lower section of greater diameter. The lower end of the spring is adjusted in its interior with the upper section of said washer, at the same time that the spring stops against a frontal side of the lower section of the above-mentioned washer.

The open elastic ring is in contact with the inner surface of the tubular hole of the upper part of the tubular housing through a curb integrated at the junction of the outer diameter and a flat base of the open elastic ring.

The tubular hole of the upper part of the tubular housing comprises a tapered structure.

Hereinafter, in order to ensure a better understanding of the present description, the object of the invention has been detailed in a series of drawings that are an integral part of said description and are included for illustrative purposes and should not be construed as limiting said invention.

BRIEF DESCRIPTION OF THE DRAWINGS

FIG. 4 shows an exploded perspective view of a first washer and an open elastic ring which are part of the system for controlling variable load of the invention.

FIG. 5 shows a cross-sectional view according to the section A-B of FIG. 1.

FIG. 6 shows a cross-sectional view according to the section C-D of FIG. 2.

DESCRIPTION OF A SAMPLE EMBODIMENT

Figure 1:
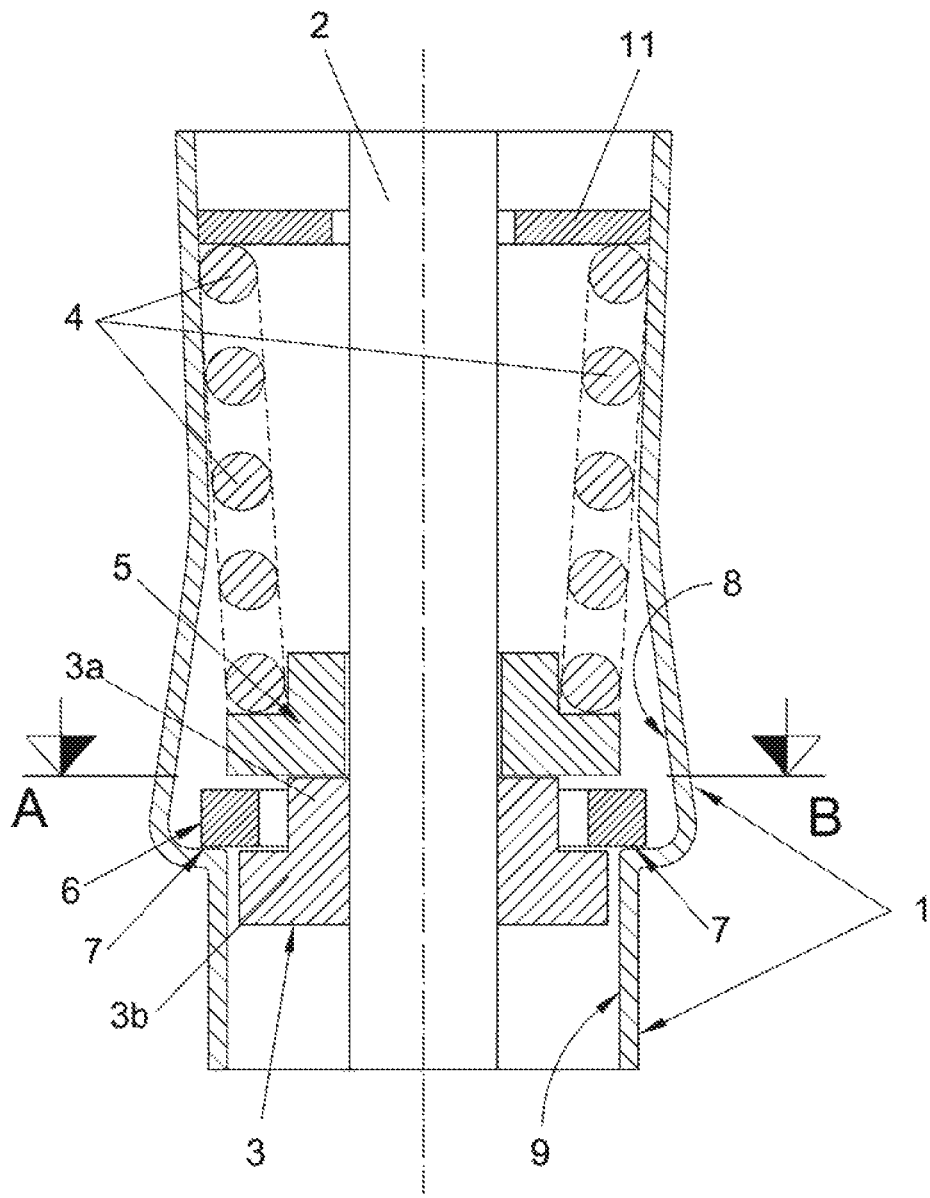
FIG. 1 shows a cross-sectional view of the system for controlling variable load in a hydraulic device, which is the object of the invention. The hydraulic device is a shock absorber located in a rest position arranged in a vertical direction.

The hydraulic device shown in the figures is a shock absorber for vehicles arranged in a vertical position comprising a tubular housing (1) containing a rod in its interior (2) to which a plunger (3) is rigidly secured that separates a first upper chamber and a second lower chamber filled with a hydraulic fluid, such that, during the movement of the shock absorber wherein the assembly of rod (2) and plunger (3) is displaced relatively and axially with respect to the tubular housing (1) through its inside, the hydraulic fluid moves from one chamber to the other varying volumes thereof, which depend on the relative position of the plunger (3) at every moment.

The plunger (3) is loosely located within the tubular housing (1), that is, there is an annular space between the outline of the plunger (3) and the inner side of the tubular housing (1).

The shock absorber shown in the figures also comprises a spring (4) that operates under compression, such that when the shock absorber is moved according to a first stroke upwards and towards a maximum extension of the shock absorber, the spring (4) is compressed offering resistance, whereas when the shock absorber is moved according to a second stroke towards a rest position of maximum compression, the spring (4) offers less compression resistance extending its length.

From this premise, the system of the invention comprises regulating the flow of hydraulic fluid between the upper and lower chambers, thus controlling the hydraulic load while the shock absorber operates.

To such purpose, a washer (5) has been provided attached from the inside to the lower end of the spring (4), at the same time said washer (5) is coupled and guided around the rod (2) above the plunger (3). The washer (5) has an upper section (5a) of a smaller diameter where an end of the spring (4) fits diametrically and a lower section (5b) of greater diameter which has a frontal side (5c) where the above-mentioned spring (4) acts as a stop.

The plunger (3) comprises an upper section (3a) of smaller diameter and a lower section (3b) of greater diameter.

An essential feature of the invention is an open elastic ring (6) located inside the tubular housing (1). This open elastic ring (6) is located at the height of the upper section (3a) of smaller diameter of the plunger (3), whereas onto the lower section (3b) of greater diameter of the plunger (3) an inner portion supports said open elastic ring (6).

Above the open elastic ring (6) the washer (5) is placed, which does not allow for the open elastic ring (6) to be placed above the washer (5) at any time and neither can the open elastic ring be located below the plunger (3).

The tubular housing (1) comprises an upper part and a lower part, the lower part arranged below the upper part, such that the junction of both parts is composed in the inside of the tubular housing (1) making up an annular seat (7) where an outer portion of the open elastic ring (6) is resting when the shock absorber is in a rest position, that is, when the spring (4) is in its most extended position pressing against the plunger (3) through the washer (5).

The upper part of the tubular housing (1) internally comprises at least a tapered hole (8) whose lower edge is joined to the lower part of the tubular housing (1) by means of the annular seat (7). In turn, this lower part of the tubular housing (1) internally comprises a cylindrical hole (9).

The spring (4) that operates under compression is attached by its lower end to the washer (5) as previously described, whereas the upper end of the spring (4) is attached to the inner side of the upper part of the tubular housing by means of a ring or any other stop, such as a flat washer (11).

In addition, between the ends of the open elastic ring (6) an intermediate passage (10) is defined through which the hydraulic fluid of the upper chamber travels to the lower chamber and vice versa, during the movement of the shock absorber, said intermediate passage being variable during the relative movement of the open elastic ring (6) as described below.

Depending on the relative position of the different elements of the shock absorber, the rod (2) moves upwards during the extension stroke of the shock absorber. Therefore, a few moments before the system for controlling the shock absorber's load starts operating, the rod (2) is in a position such that the plunger (3) is not in contact with any other element. That is, the plunger (3) is located in an area of the tubular housing (1) at a lower level below the area where the diameter begins to vary in the tubular housing (1) related to the annular seat (7) that separates both parts of the tubular housing (1).

In this situation, the spring (4) presses against the washer (5), and in turn, this washer (5) presses and maintains the open elastic ring (6) positioned against the annular seat (7) of the tubular housing (1). The hydraulic fluid may freely move and flow from one chamber to the other.

When the shock absorber is moved towards its maximum extension, the operation is as follows:

The upper side of the plunger (3) is in contact with the lower side of the washer (5). The open elastic ring (6) is housed around the upper section (3a) of smaller diameter comprised in the plunger (3).

The package created by the plunger (3) and washer (5) compresses the spring (4) releasing the pressure that keeps the open elastic ring (6) against the annular seat (7) of the tubular housing (1). Thus, the pressure increase in the cavity of the hydraulic fluid housed in the region or upper chamber above the open elastic ring (6), along with the ascent of the plunger (3), causes the open elastic ring (6) to be supported against the plunger (3) in a transitional frontal side (3c) between the outer diameter (3a) and the outer diameter (3b) of the plunger (3). It is worth noting that FIG. 4 shows these elements in detail.

The variable geometry of the tapered hole (8) of the upper part of the tubular housing (1), whose diameter becomes smaller towards the top in the compression direction of the spring (4) and, therefore, is reduced in the extension direction of the rod (2) and plunger (3), brings said variable geometry into contact with the outer surface of the open elastic ring (6) through its outer diameter (6a).

The geometric intersection between the tubular housing (1), the plunger (3) and the open elastic ring generates a reduction in the intermediate passage (10) constituting the fluid passing area. At first, this intermediate passage (10) is defined as a first passage fully opened which is kept until the outer diameter (6a) initially comes into contact with the inner surface of the tapered hole (8) of the tubular housing (1). Hereinafter, as the open elastic ring (6) ascends, the progressive reduction of the diameter of the tapered hole (8) reduces the passing section of the intermediate passage (10) defined between the free ends of the above-mentioned open elastic ring (6). The open elastic ring (6) comes into contact with the inner surface of the tapered hole (8) through an annular curb (6c) wherein the outer diameter (6a) and a frontal side of the open elastic ring (6) converge.

When the variation of the tapered hole (8) of the tubular housing (1) ends, the reduction in the outer diameter (6a) of the open elastic ring (6) has in turn generated the reduction of the intermediate passage section (10) defined between the ends of the open elastic ring (6). The intermediate passage (10) defined between the ends of the open elastic ring (6) comprises a smaller passing area (10a) when the open elastic ring (6) is in contact with the inner surface of the tapered hole (8) at a certain height, while creating a greater passing area (10b) when said open elastic ring (6) is not in contact with the inner surface of the tapered hole (8).

Figure 2:
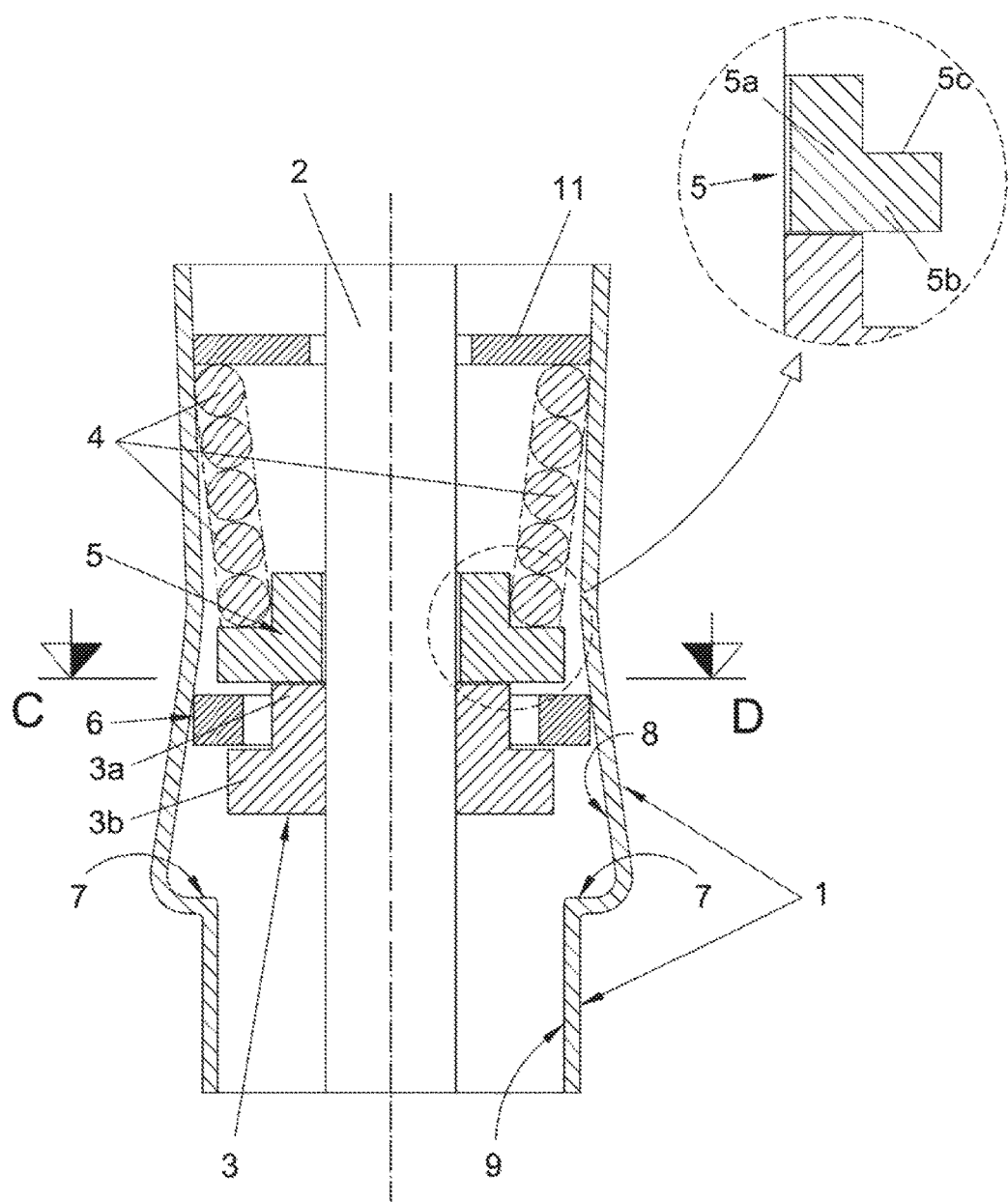
FIG. 2 shows a view similar to FIG. 1 wherein the hydraulic device is located at the end of a maximum extension stroke where a spring that operates under compression is fully compressed, its coils being in contact with each other.
Figure 3:
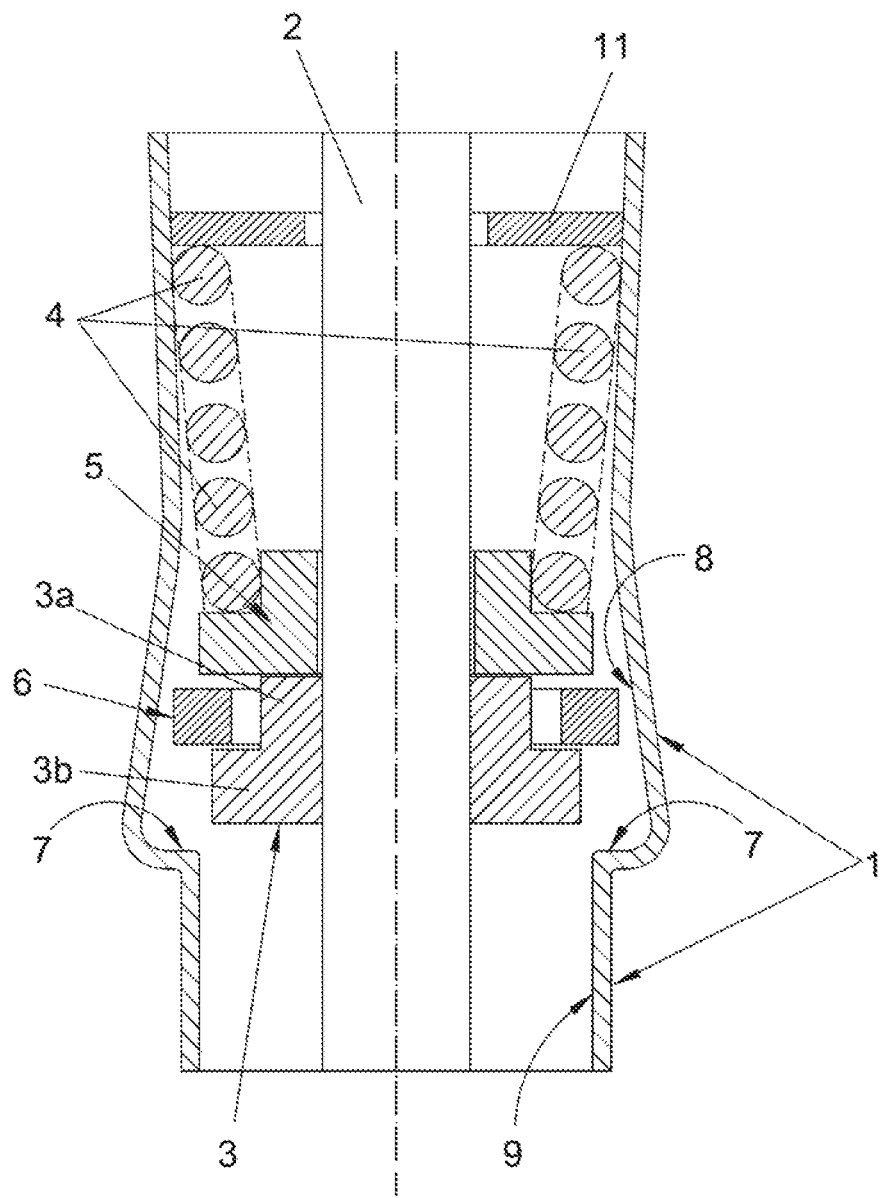
FIG. 3 shows a view similar to FIGS. 1 & 2, wherein the hydraulic device is in an intermediate position.

If the stroke towards the maximum extension position of the shock absorber is reached, the spring (4) comprises a block contacting the coils (FIG. 2), therefore the package formed by the spring (4), plunger (3) and washer (5) acts as a mechanical stop of the system.

The controlled transition between the smaller passing area (10a) and the greater passing area (10b), through the controlled reduction of the diameter (6a) of the open elastic ring (6) and, therefore, of the intermediate passage (10), is what generates an increase in the load as the rod (2) and the plunger (3) ascend towards the maximum extension of the shock absorber. By reducing the passing area of the fluid, the speed decreases and pressure increases in the upper chamber, generated above the open elastic ring (6).

The smaller the passing area related to the intermediate passage (1), the greater the pressure in the upper chamber above the open elastic ring (6). This pressure phenomenon is transmitted to the rod (2) through the plunger (3), which generates a force opposing the extension movement of the shock absorber that does not end until the rod (2) is fully stopped.

Upon initiating the compression stroke opposite to the extension movement of the shock absorber, the rod (2) descends, therefore the plunger (3) no longer drags the open elastic ring (6), increasing the fluid passage between an inner diameter (6b) of the open elastic ring (6) and the rod diameter (2), thus discontinuing the generation of pressure. The spring (4) through the washer (5) pushes the open elastic ring (6) until it is returned to its initial rest position, wherein it is supported against the annular seat (7) of the tubular housing (1). It is worth highlighting that, as shown in the perspective view of FIG. 4, as cases of non-limiting examples, the basic geometric shapes of the design tend to be generated depending on the revolutions of the axis of the rod (2). However, this is not mandatory, since the final shape will depend on the variation of the area intended to be achieved, as well as on other specifications such as weight, resistance, inertia, etc.

One of the advantages of the current design of the invention is that the finish of the components could be made component by component to enhance the continuous control of the passing area related to the intermediate passage (10), based on the variation of the outer diameter (6a) of the open elastic ring (6) and the intermediate passage (10) of the ring (6). In this regard, the following is observed:

The open elastic ring (6), as previously referred to, is the key element of the invention, since the continuous and detailed control of the passing area of the hydraulic fluid depends on its significant geometry variation, contrary to other inventions of similar characteristics.

In this regard, the geometry of the open elastic ring (6) is not exclusively related to that illustrated in FIG. 4, such that the opening may vary in shape and dimension, with parallel walls, angled, with radius, etc.

In addition, the open elastic ring may comprise recesses, orifices or, in general, any kind of slot that contributes to the way in which the passing area varies.

It is also worth noting that the open elastic ring can be built using different methods such as stamping, sintering, extrusion and bending, machining, etc., and with any material capable of resisting the stresses generated during its operation, such as steel, bronze, aluminum, etc.

The plunger (3) fulfils the function of supporting the open elastic ring (6), of limiting the inner area of the open elastic ring (6) by means of a greater outer diameter (3d) of the lower section (3b) and also acts as a force-transmission element to the rod (2). The upper section (3a) of the plunger (3) has a smaller outer diameter that is referenced with number (3e).

Once again, its geometry is not limited exclusively to that shown in the drawings, as furnished herewith.

The outer diameters, the greater (3d) and smaller (3e) diameters of the plunger (3), may be carried out by means of one or several components, provided that the lower component of the package works rigidly with the rod (2) and drags the assembly. Said lower component may be joined to the rod (2) by welding, stapling, etc.

The open elastic ring may have recesses, orifices and, in general, any type of split that contributes in a positive manner to the way in which the passing area of the intermediate passage (10) of the open elastic ring (6) varies when it is resiliently deformed.

The component or components that generate the greater outer diameter (3d), as well as the working area of the open elastic ring (6), may be manufactured with metallic material, compounds or plastic, depending on the stresses and difficulties of the splits or orifices carried out.

The tubular housing (1) has an inner geometry that comprises the assembly and guides the open elastic ring (6) through the inside. Once again, its geometry is not limited exclusively to that illustrated in the drawings.

Thus, the diameter variation may be achieved by processes on a straight pipe, such as narrowing, bell mouthing, machining, etc., or by means of an additional accessory.

The washer (5) works as spring support (4), fixes from the top the space where the open elastic ring (6) is located and pushes it by means of the spring (4) until its initial position when the stop action ends. Based on the geometry of the spring (4), the washer (5) is optional, thus, the spring (4) would directly be supported on the open elastic ring (6).

The washer (5) may be manufactured both in metal to ensure high strength, or in plastic material or compound to ensure smoothness and lack of noises upon the support.

The spring (4) is in charge of returning the assembly to its initial rest position, as well as of providing the load depending on the position. To optimize the development of the load and the return of the assembly to its position, the spring (4) is provided with constant or variable rigidity and may be composed of a cross section wire of any choice in terms of shape and size, or of a series of rings. The spring (4) may operate freely within the tubular housing (1) or be fastened by interference or by an additional component similar to the washer (5).

Given the versatility and the many possible designs of the invention, the assembly can be used in different positions for various applications. As regards the shock absorber, the invention may be used as a hydraulic rebound stop or as a hydraulic compression stop. It is valid for any shock absorber technology and may be installed in the main body of the shock absorber or in adjacent bodies, for example, in reserve chambers of hydraulic fluid.

In general, the invention is applicable for any hydraulic device designed to be part of a structure, both mobile or fixed, to provide a mechanical-hydraulic end of stroke, as it occurs in structures (solar panels, metallic structures for buildings, etc.) or in vehicles.

Taking into account the numbering adopted for the figures, the system for controlling variable load in a hydraulic device comprises the following nomenclature used in the description:
1. Tubular housing
2. Rod
3. Plunger
3a. Upper section
3b. Lower section
3c. Frontal side
3d. Greater outer diameter
3e. Smaller outer diameter
4. Spring
5. Washer
5a. Upper section
5b. Lower section
5c. Frontal side
6. Open elastic ring
6a. Outer diameter
6b. Inner diameter
6c. Curb
7. Annual seat
8. Tubular hole
9. Cylindrical hole
10. Intermediate passage
10a. Minimum passing area
10b. Maximum passing area
11. Flat washer

The invention claimed is:

1. A system for controlling variable load in a hydraulic device, wherein the hydraulic device comprises a tubular housing containing a rod to which a plunger is rigidly secured that separates an upper chamber and a lower chamber both filled with a hydraulic fluid, such that, when the plunger and the rod move, the plunger and the rod move together in a relative and axial manner through the tubular housing, the hydraulic fluid is moved from a first of the upper chamber and the lower chamber to a second of the upper chamber and the lower chamber, varying a volume of the upper chamber and a volume of the lower chamber, also comprising a spring that operates under compression resisting movement of the plunger in one direction when the plunger moves toward a maximum extension position of the hydraulic device; wherein the movement of the plunger towards the maximum extension position progressively reduces the volume of the upper chamber, the hydraulic device also being capable of adopting a rest position of minimum extension in which the spring has a maximum length;

wherein:
the system comprises an open elastic ring located inside the tubular housing surrounding at least one part of the plunger, the open elastic ring having an adjustable intermediate passage between first and second radial ends of the open elastic ring through which the hydraulic fluid is to flow between the upper chamber and the lower chamber in both directions, the open elastic ring being configured to be dragged by the movement of the rod and the plunger;

the first radial end of the open elastic ring defines a first inner surface extending in an axial direction of the tubular housing, the second radial end of the open elastic ring defines a second inner surface extending in the axial direction of the tubular housing; and the first inner surface is parallel to the second inner surface such that no portion of the open elastic ring overlaps any other portion of the open elastic ring in a circumferential direction of the open elastic ring;

the tubular housing comprises an upper part having an interior comprising at least one tubular hole that narrows from bottom to top and a lower edge of greater diameter which joins a lower part of the tubular housing by an annular seat onto which at least an outer portion of the open elastic ring is supported in the rest position of the hydraulic device;

the open elastic ring has an outer diameter between a smaller diameter of the tubular hole and a larger diameter of the tubular hole, and the outer diameter of the open elastic ring is greater than an outer diameter of the plunger; and wherein during the movement of the plunger towards the maximum extension position of the hydraulic device, an outer side of the open elastic ring is in contact with an inner side of the tubular hole so as to progressively change a passing section of the adjustable intermediate passage as the open elastic ring approaches the maximum extension position of the hydraulic device.

2. The system according to claim 1, wherein a minimum passing section of the adjustable intermediate passage of the open elastic ring coincides with a maximum compression of the spring.

3. The system according to claim 1, wherein during a maximum compression of the spring, the first and second radial ends of the open elastic ring are in contact with each other, completely blocking the adjustable intermediate passage.

4. The system according to claim 2, wherein, at the maximum compression of the spring in which the hydraulic device is at the maximum extension position, coils of the spring are in contact with each other.

5. The system according to claim 1, wherein the plunger comprises a lower section of greater diameter and an upper section of smaller diameter around which the open elastic ring is attached.

6. The system according to claim 1, wherein the open elastic ring is configured to come into contact with an inner surface of the tubular hole through an edge integrated at a junction of the outer diameter of the open elastic ring and a flat base of the open elastic ring.

7. The system according to claim 1, wherein the spring comprises a tapered structure.

8. The system according to claim 1, wherein a lower end of the spring is coupled to a washer having free axial movement, the washer being arranged around the rod and above the plunger onto which the washer rests.

9. The system according to claim 8, wherein axial movement of the open elastic ring is restricted by the washer and by a lower section of the plunger.

10. The system according to claim 8, wherein the washer comprises an upper section of smaller diameter and a lower section of greater diameter, an inner side of the lower end of the spring being adjusted to the upper section of the washer, while the spring acts as a stop against a frontal side of the lower section of the washer.

* * * * *